United States Patent
Kitajo et al.

(10) Patent No.: US 10,357,820 B2
(45) Date of Patent: Jul. 23, 2019

(54) STEERING-WHEEL CORE AND CASTING METHOD THEREFOR

(71) Applicant: AUTOLIV DEVELOPMENT AB, Vargarda (SE)

(72) Inventors: Kensaku Kitajo, Yokohama (JP); Jun Kato, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 15/553,873

(22) PCT Filed: Feb. 16, 2016

(86) PCT No.: PCT/JP2016/054369
§ 371 (c)(1),
(2) Date: Jul. 17, 2018

(87) PCT Pub. No.: WO2016/136526
PCT Pub. Date: Sep. 1, 2016

(65) Prior Publication Data
US 2018/0361467 A1 Dec. 20, 2018

(30) Foreign Application Priority Data
Feb. 27, 2015 (JP) ................................. 2015-039207

(51) Int. Cl.
*B22C 9/28* (2006.01)
*B22D 25/02* (2006.01)
(Continued)

(52) U.S. Cl.
CPC .................. *B22C 9/28* (2013.01); *B22C 9/06* (2013.01); *B22D 17/22* (2013.01); *B22D 21/007* (2013.01);
(Continued)

(58) Field of Classification Search
CPC .. B22C 9/06; B22C 9/28; B22D 17/22; B22D 21/00; B22D 21/007; B22D 25/02
(Continued)

(56) References Cited

U.S. PATENT DOCUMENTS

| 6,244,620 B1 | 6/2001 | Bathon et al. |
| 2001/0025546 A1 | 10/2001 | Sugiyama et al. |
| 2011/0235957 A1* | 9/2011 | Vissers et al. ....... B22D 17/007 384/523 |

FOREIGN PATENT DOCUMENTS

| DE | 601 07 023 T2 | 11/2005 |
| DE | 601 22 042 T2 | 12/2006 |

(Continued)

OTHER PUBLICATIONS

International Search Report of PCT/JP2016/054369 dated Apr. 19, 2016.

*Primary Examiner* — Kevin P Kerns
(74) *Attorney, Agent, or Firm* — Brinks Gilson & Lione

(57) ABSTRACT

A steering-wheel core and a method for casting the same capable of eliminating the need to perform finishing processing after casting and decreasing manufacturing cost even when the steering-wheel core is cast using a molten metal. The method for casting a steering-wheel core (100) includes: providing a protruding portion (92) in a surface (91) of an inner surface of a casting die (90), with the surface defining a nut seat surface; and causing a molten metal to hit on the protruding portion (92) when the molten metal flows into the casting die (90) such that a change occurs in the flowing direction of the molten metal flowing toward the surface (91) that defines the nut seat surface.

7 Claims, 6 Drawing Sheets

(51) Int. Cl.
  *B22C 9/06* (2006.01)
  *B22D 17/22* (2006.01)
  *B22D 21/00* (2006.01)
  *B62D 1/04* (2006.01)
  *B62D 1/06* (2006.01)
  *B62D 1/08* (2006.01)
  *B62D 1/10* (2006.01)

(52) U.S. Cl.
  CPC ............... *B22D 25/02* (2013.01); *B62D 1/04* (2013.01); *B62D 1/06* (2013.01); *B62D 1/08* (2013.01); *B62D 1/10* (2013.01)

(58) Field of Classification Search
  USPC ........................................ 164/133, 137, 369
  See application file for complete search history.

(56) References Cited

FOREIGN PATENT DOCUMENTS

| | | |
|---|---|---|
| EP | 1 134 144 A1 | 9/2001 |
| EP | 1 179 469 A1 | 2/2002 |
| ES | 2 269 245 T3 | 4/2007 |
| FR | 2 812 607 A1 | 2/2002 |
| JP | 2000-301998 A | 10/2000 |
| JP | 2001-260898 A | 9/2001 |
| JP | 2002-087283 A | 3/2002 |
| JP | 2004-090815 A | 3/2004 |
| WO | WO 2013/187287 A1 | 12/2013 |

\* cited by examiner

STEERING-WHEEL CORE AND CASTING METHOD THEREFOR

CROSS-REFERENCE TO RELATED APPLICATIONS

This application is a 35 U.S.C. § 371 national phase application of International Application No. PCT/JP2016/054369, filed Feb. 16, 2016, which claims the benefit of priority under 35 U.S.C. § 119 to Japanese Patent Application No.: JP 2015-039207, filed Feb. 27, 2015, the contents of which are incorporated herein by reference in their entirety.

FIELD OF THE INVENTION

The present invention relates to a steering-wheel core and a method for casting the same.

BACKGROUND

A steering wheel is attached to an upper end of a steering shaft in order to steer an automobile. When a driver rotates the steering wheel, a steering mechanism is operated and the direction of steered wheels is changed, whereby steering action is provided.

For example, referring to the appended drawings as illustrated in FIG. 6(A), as a conventional steering-wheel core, a core 200 in which a spoke 221 extending outward is attached to a boss 231 provided at the center and a circular rim 211 is coupled to an outer circumference of the spoke 221 is known. A soft synthetic resin coating such as, for example, a foamed polyurethane resin is formed on such a core 200, whereby a steering wheel is manufactured (for example, see Japanese Patent Application Publication No. 2000-301998).

Since the steering wheel is rotated while being held by the operator's hands as described above and the rotation direction thereof is changed frequently, the steering wheel needs to have rigidity. Therefore, metals such as iron, aluminum, or magnesium are often used for the structure of the steering wheel.

In recent years, a method of integrally molding a steering-wheel core by casting using a magnesium alloy having low density as a material has been widely used in vehicles including automobiles.

Present methods of casting using a magnesium alloy as a material has the following problem. When a high-temperature and high-pressure molten magnesium alloy is caused to flow into a die, if the molten magnesium alloy makes direct contact with an inner surface of the die, the molten magnesium alloy flows continuously into the contacting portion. Therefore, a local hot spot is formed and the surface of a product after casting may become rougher than a specific surface roughness.

Particularly, when a steering wheel and a steering shaft are coupled, although a nut N (see FIG. 6(B)) is fastened to a distal end side (S3 in FIG. 6(B)) of the steering shaft, a nut seat surface 235 where the nut N and a boss 231 make contact with each other needs to have a clean casting surface in order to control the torque of the nut N. However, in the conventional technique, the surface roughness of the nut seat surface may exceed a specified roughness after casting. In this case, it is necessary to perform finishing processing such as grinding on the surface of a product after casting, which imposes manufacturing cost penalties.

In view of such a problem, an object of the present invention is to provide a steering-wheel core and a method for casting the same capable of eliminating the need to perform finishing processing after casting and decreasing a manufacturing cost, even when the steering-wheel core is cast using a molten metal.

SUMMARY OF THE INVENTION

In order to solve the above-described problem, a method for casting a steering-wheel core according to the present invention is a method for casting a steering-wheel core including a boss core portion coupled to a steering shaft, a rim core portion, and a spoke core portion that couples the boss core portion and the rim core portion to each other, the boss core portion having a nut seat surface that makes contact with a nut when the nut fastened to a distal end of the steering shaft inserted into the boss core portion. The method including, providing a protruding portion on a surface of an inner surface of a casting die, with the surface forming the nut seat surface, and causing a molten metal to hit on the protruding portion when the molten metal flows into the casting die so that a flowing direction of the molten metal flowing toward the surface that defines the nut seat surface is changed.

In the method for casting the steering-wheel core according to the present invention, when the molten metal flows into a cavity, the molten metal hits on the protruding portion formed on a surface of the inner surface of the casting die defining the nut seat surface, and the flowing direction of the molten metal is changed. Therefore, it is possible to suppress the molten metal flowing toward the surface that defines the nut seat surface from making direct contact with the surface that defines the nut seat surface. Due to this, the high-temperature and high-pressure molten magnesium alloy is suppressed from continuously making contact with the surface that defines the nut seat surface and the occurrence of a local hot spot is suppressed. As a result, it is possible to decrease the surface roughness (casting surface roughness) of the product in the local area after casting. As a result, it is possible to eliminate the need to perform surface finishing processing after casting and to decrease the manufacturing cost.

In the method for casting the steering-wheel core according to the present invention the flowing direction of the molten metal is preferably changed so that an amount of the molten metal which flows into the casting die at least in an initial flowing stage and makes direct contact with the surface that defines the nut seat surface decreases.

In the method for casting the steering-wheel core according to the present invention, the protruding portion is preferably formed in an annular form so as to surround a circumference of the surface that defines the nut seat surface.

In the method for casting the steering-wheel core according to the present invention, the protruding portion preferably protrudes at least 1.5 mm toward a back surface side of the boss core portion.

A steering-wheel core according to the present invention is a steering-wheel core including a boss core portion coupled to a steering shaft, a rim core portion, and a spoke core portion that couples the boss core portion and the rim core portion to each other. The boss core portion having a nut seat surface that makes contact with a nut when the nut is fastened to a distal end of the steering shaft inserted into the boss core portion, wherein a recess that is preferably depressed toward a back surface side of the boss core portion is formed in the nut seat surface, and the recess is preferably formed in an annular form so as to surround a circumference of the nut seat surface.

According to the present invention, it is possible to provide a steering-wheel core and a method for casting the same capable of eliminating the need to perform finishing processing after casting and decreasing a manufacturing cost even when the steering-wheel core is cast using a molten metal.

DETAILED DESCRIPTION OF THE INVENTION

Hereinafter, an embodiment of the present invention will be described with reference to the accompanying drawings. The following embodiment is a suitable application example, and the scope of application of the present invention is not limited to this.

Figure 1A:
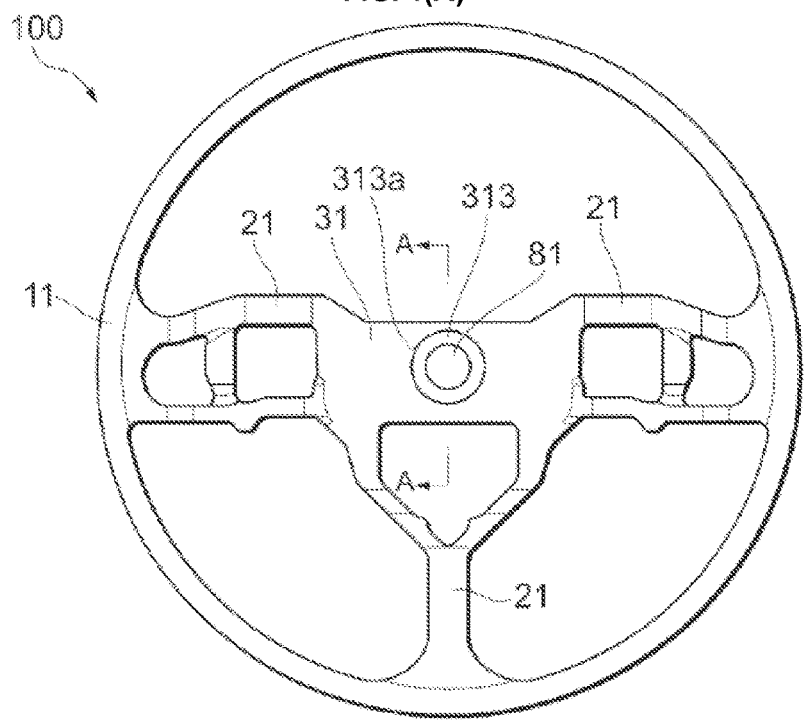
FIGS. 1(A) and 1(B) are diagrams illustrating a schematic configuration of a steering-wheel core according to the present embodiment.
Figure 1B:
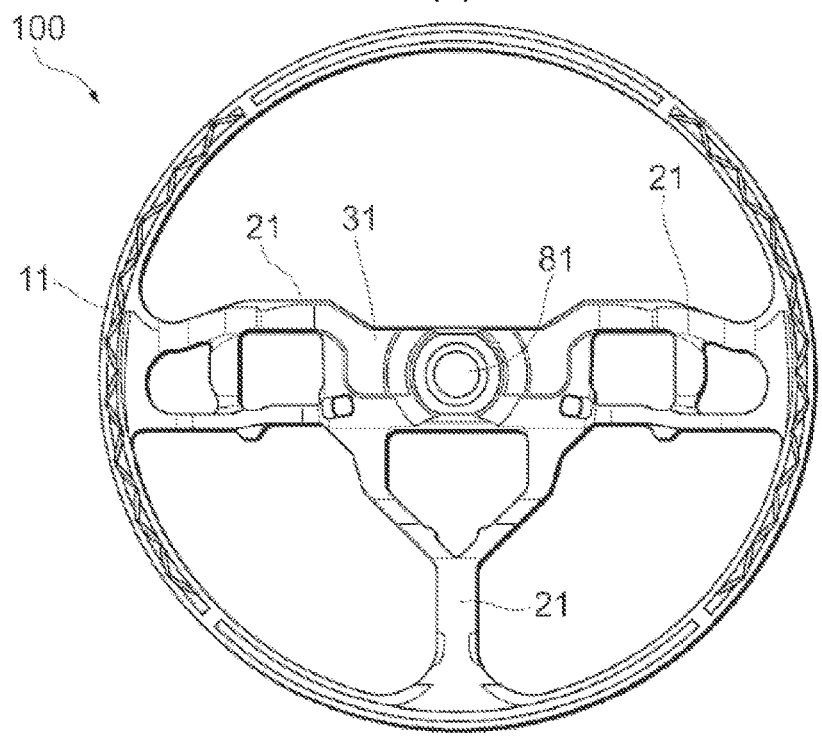
Figure 2A:
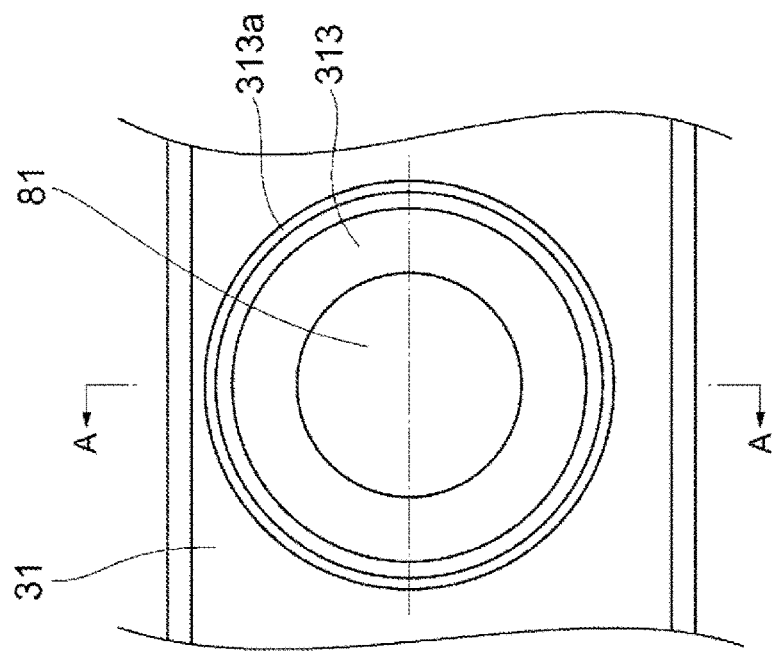
FIGS. 2(A) and 2(B) are diagrams illustrating a schematic configuration of a boss core portion illustrated in FIGS. 1(A) and 1(B).
Figure 2B:
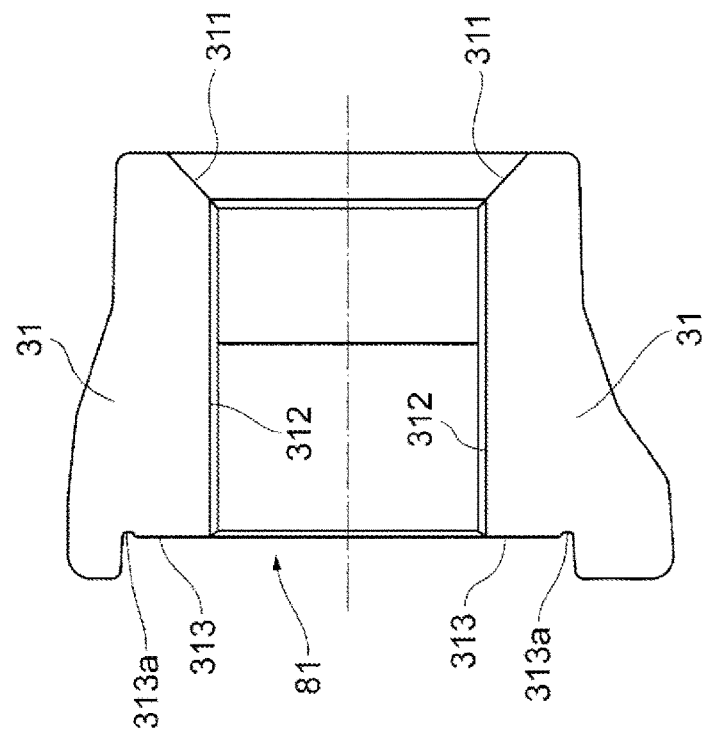

First, a configuration of a steering-wheel core according to an embodiment of the present invention will be described with reference to FIGS. 1(A) and 1(B) and FIGS. 2(A) and 2(B). FIG. 1(A) is a front view illustrating a schematic configuration of a steering-wheel core. FIG. 1(B) is a rear illustrating a schematic configuration of the steering-wheel core. FIG. 2(A) is a front view illustrating a boss core portion illustrated in FIG. 1(A). FIG. 2(B) is a cross-sectional view of a boss core portion along line A-A illustrated in FIG. 1(A).

In FIGS. 1(A) and 1(B), reference numeral 100 indicates a steering-wheel core of an automobile. This steering-wheel core 100 is integrally molded using metal such as, for example, iron aluminum, or magnesium, and a soft synthetic resin coating such as, for example, a foamed polyurethane resin is formed on the steering-wheel core 100, whereby a steering wheel is manufactured. Although not illustrated in the drawings, an airbag apparatus (an airbag module) or the like attached to an occupant side of a main body is mounted on this steering wheel.

The steering wheel is attached to a body-side steering shaft S (see FIG. 5) which is a steering shaft and the steering shaft S is provided in a vehicle generally in a tilted state. In the following description, a driver side which is an airbag apparatus side will be referred to as a front side, and the opposite side of the driver side (that is, a body side which is the side close to the steering shaft S) will be referred to as a rear surface side (a back surface side).

As illustrated in FIGS. 1(A) and 1(B), the steering-wheel core 100 includes a rim core portion 11 that has an approximately ring shape, for example, and is provided for grasping by the vehicle operator, a boss core portion 31 positioned on the inner side of the rim core portion 11, and a plurality of spoke core portions 21 that couple the boss core portion 31 and the rim core portion 11. The boss core portion 31, the spoke core portion 21, and the rim core portion 11 are molded by casting a molten alloy of iron, aluminum, magnesium, or the like, for example.

As illustrated in FIGS. 2(A) and 2(B), the boss core portion 31 has an attachment hole 81 for attachment to the steering shaft S, formed at a central side thereof. A female tapered portion 311 and a female serration 312 formed on a rear surface side (the left side in FIG. 2(B)) of the female tapered portion 311 are formed in a portion of the boss core portion 31 making contact with the steering shaft S. The female tapered portion 311 corresponds to a male tapered portion S1 (see FIG. 5) of the steering shaft S, the female serration 312 corresponds to a male serration S2 (see FIG. 5) located close to the steering shaft S, and the boss core portion 31 is attached to the steering shaft S.

The boss core portion 31 has a nut seat surface 313 which is disposed on the front side (the left side in FIG. 2(B)) and which makes contact with a nut N (see FIG. 5) that engages with a distal end side of the steering shaft S. A recess 313a that is depressed toward the back surface side (the right side in FIG. 2(B) is formed at an end of the nut seat surface 313. Conventionally, when a steering-wheel core is molded as a magnesium alloy cast product, a surface roughness (a casting surface roughness) is formed on the nut seat surface 313. However, the present embodiment has an advantage that the surface roughness of the nut seat surface 313 can be improved. The result of improvement in the surface roughness of the nut seat surface 313 will be described later.

Figure 5:
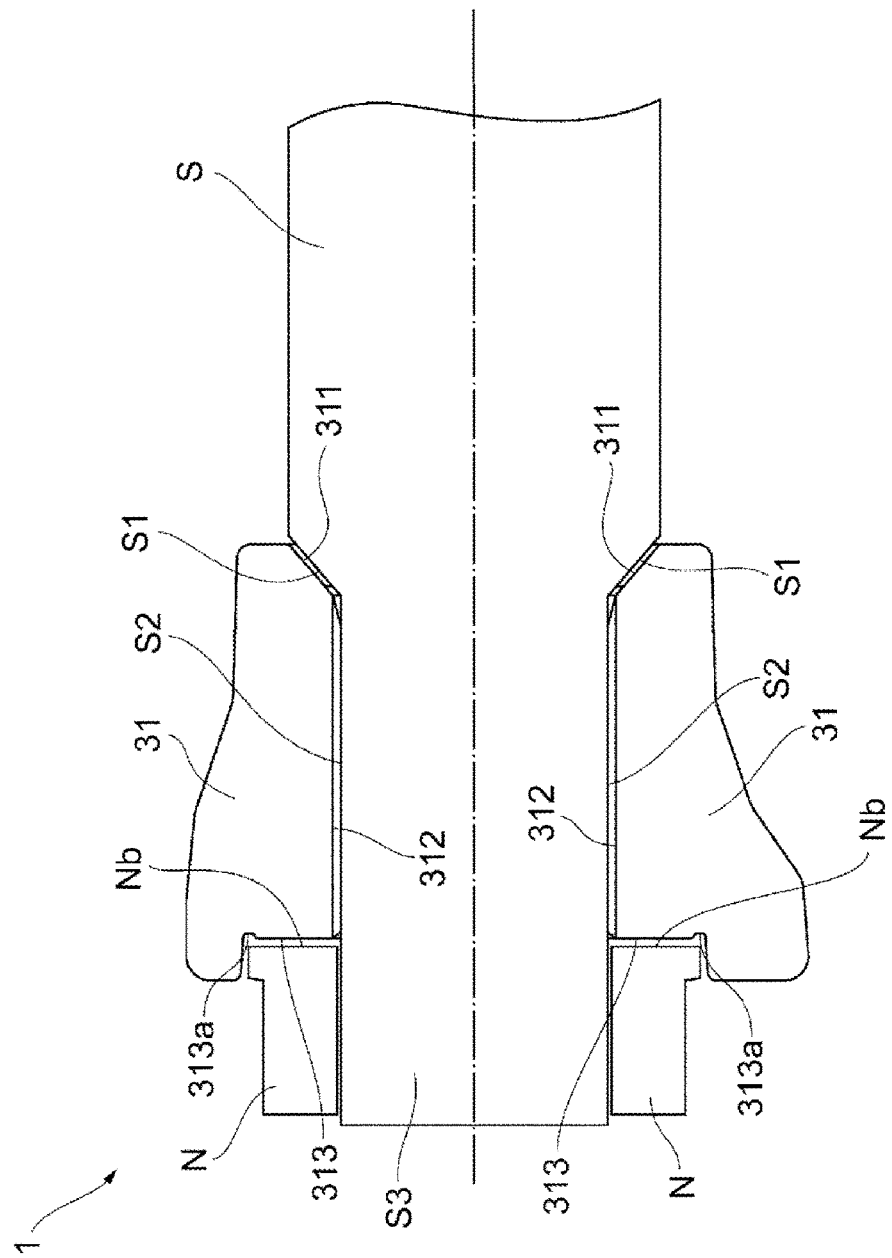
FIG. 5 is a cross-sectional view illustrating a schematic configuration of the periphery of a boss portion of a steering apparatus.

FIG. 5 is a diagram illustrating a schematic configuration of a steering apparatus 1 in which the steering-wheel core 100 illustrated in FIGS. 1(A) and 1(B) is attached to the steering shaft S. As illustrated in FIG. 5 the steering apparatus 1 includes at least the steering-wheel core 100, the steering shaft S, and the nut N coupled to the steering shaft S. A screw groove (not illustrated) is formed in a fastening portion S3 provided on the distal end side of the steering shaft S, and the nut N as fastening means is screwed into the screw groove. When an assembly operator attaches the steering-wheel core 100 (see FIGS. 1(A) and 1(B)) to the steering shaft. S, first, the nut N is screwed into the fastening portion S3 of the steering shaft S. Moreover, the operator fastens the nut N with predetermined fastening torque using a hexagonal socket attached to a torque wrench or the like, for example. When the operator fastens the nut N with predetermined fastening torque, a boss-side surface Nb of the nut N and a surface (the nut seat surface 313) of the boss core portion 31 close to the nut N are fixed by making contact with each other.

Subsequently, a method for casting a steering-wheel core will be described. In the present embodiment, a high-temperature and high-pressure molten magnesium alloy is injected into a casting die whereby a steering-wheel core as a cast product is molded. In the following description, although an example in which a molten magnesium alloy is used is described, another material such as a molten alloy of iron or aluminum may be used.

Figure 3A:
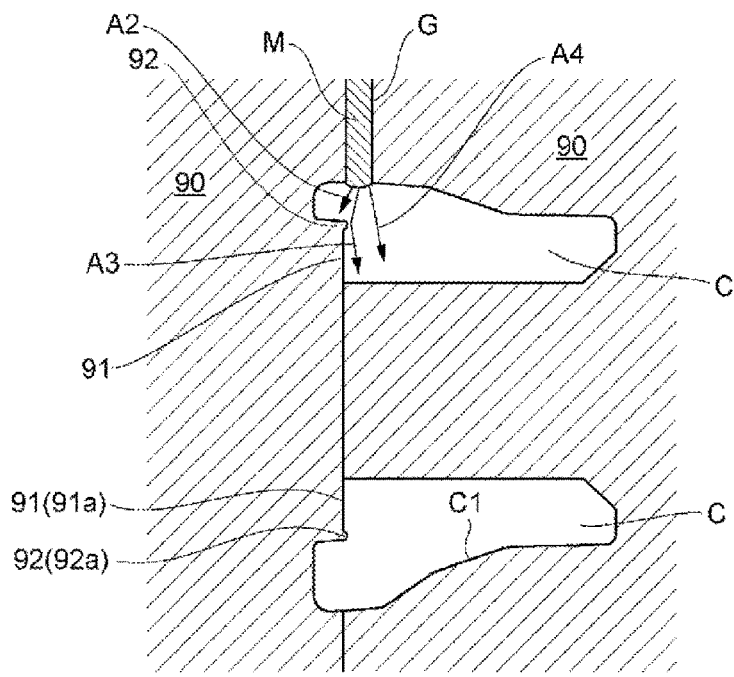
FIGS. 3(A) and 3(B) are diagrams for describing a method for casting a steering-wheel core according to the present embodiment.
Figure 3B:
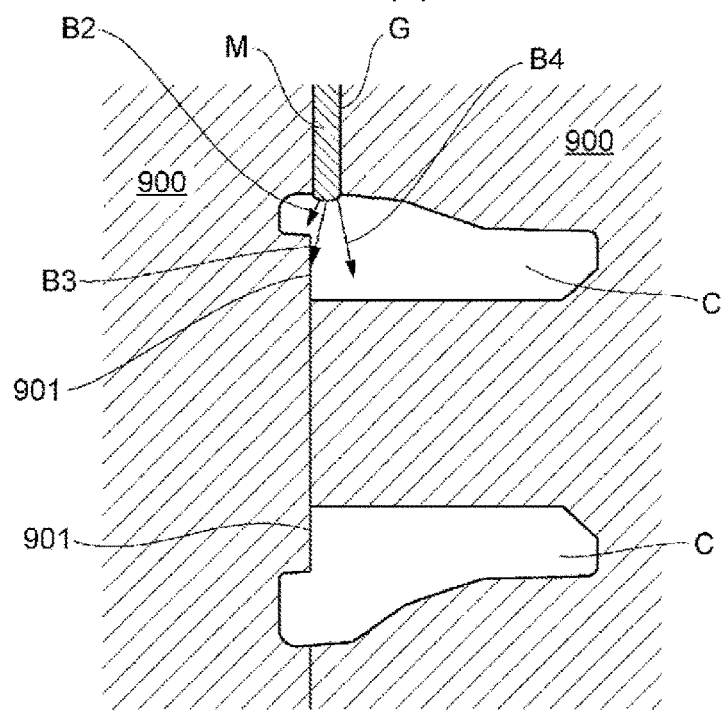

FIG. 3(A) is a diagram illustrating a state in which a molten magnesium alloy flows into a casting die for molding a steering-wheel core. FIG. 3(B) is a diagram illustrating a state in which a molten magnesium alloy flows into a casting die for molding a steering-wheel core in a comparative example. When a cavity C illustrated in FIG. 3(A) and FIG. 3(B) is filled with a molten magnesium alloy M, a boss core portion as a magnesium alloy cast product is molded.

Figure 6A:
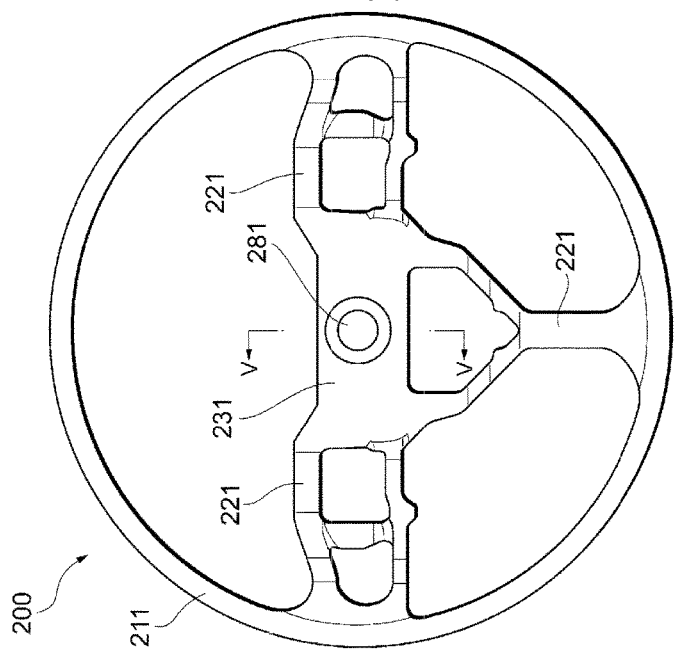
FIGS. 6(A) and 6(B) are diagrams illustrating a schematic configuration of a steering-wheel core according to a comparative example.
Figure 6B:
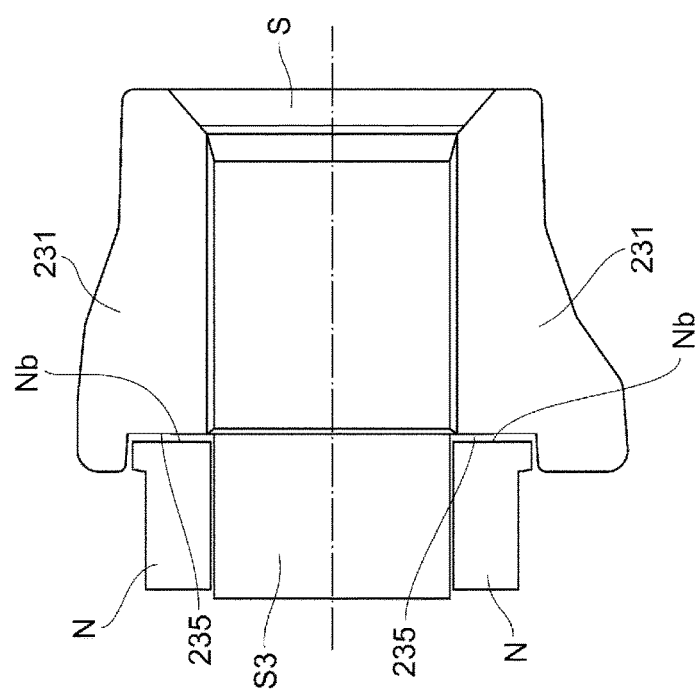

First, a method for casting a steering-wheel core according to a comparative example will be described. In the comparative example, a molten magnesium alloy flows into a casting die in the following manner. First, a casting die 900 for molding a steering-wheel core as a magnesium alloy cast product is prepared. Subsequently, as illustrated in FIG. 3(B), a high-temperature and high-pressure molten magnesium alloy M flows through a gate G connected to an upper part of the cavity C so as to flow into the cavity C. When the molten magnesium alloy M flows from the gate G into the cavity C, the molten magnesium alloy M flows in the directions indicated by arrows B2, B3, and B4 to fill the cavity C. The molten magnesium alloy M flowing in the direction B3 (that is, the direction from the gate G toward a casting die inner surface 901 (the inner surface of the casting die 900 on the left side in FIG. 3(B))) makes direct contact with the casting die inner surface 901 without changing its direction. If the molten magnesium alloy M continuously flows into this contact portion a local hot spot is formed and the surface of a product after casting may become rough. This casting die inner surface 901 is a portion that defines the nut seat surface 235 (FIG. 6(B)) of the boss core portion 231 in the product after casting. The nut seat surface 235 is a surface that makes contact with the nut N fastened to the steering shaft S, and a predetermined surface roughness is required for controlling the torque of the nut N. However, in the comparative example, as described above, since the surface of the product after casting becomes rough, it is necessary to perform finishing processing on the nut seat surface 235. As a result, the comparative example has a problem that the finishing processing step incurs an additional manufacturing cost.

Therefore in the present embodiment, in order to solve such a problem, a molten magnesium alloy flows into a casting die to cast a steering-wheel core in the following manner.

First, a casting die 90 for molding a steering-wheel core as a magnesium alloy cast product is prepared.

Subsequently, a molten magnesium alloy M flows into the casting die 90 via the following casting step. As illustrated in FIG. 3(A), the molten magnesium alloy M flows through a gate G connected to an upper part of a cavity C to flow into the cavity C. When the molten magnesium alloy M flowing into the gate G starts flowing into the cavity C, the molten magnesium alloy M flows in any one of the directions indicated by arrows A2, A3, and A4 to fill the cavity C. The molten magnesium alloy M flowing in the direction indicated by arrow A3 (that is, the direction from the gate G toward a surface (hereinafter referred to as a "seat surface defining surface 91") of the casting die inner surface that defines the nut seat surface) hits on a protruding portion 92 formed on an outer circumference side (the upper side in FIG. 3(A)) of the seat surface defining surface 91, and the flowing direction changes.

More specifically, when the molten magnesium alloy M flowing in the direction from the gate G toward the seat surface defining surface 91 hits on the protruding portion 92 formed on the outer circumference side of the seat surface defining surface 91, the molten magnesium alloy M fills the cavity C while changing its flowing direction so that the amount of the molten magnesium alloy M flowing into the casting die 90 at least in an initial flowing stage, making direct contact with the seat surface defining surface 91 decreases. The initial flowing stage includes a state in which a predetermined period (for example, a period elapsed until half the volume of the cavity C is filled) is elapsed from the start of flowing as well as the time point at which the molten magnesium alloy M starts flowing into the cavity C.

Although FIG. 3(A) illustrates an example in which the flowing direction (the direction indicated by arrow A3) of the molten magnesium alloy M flowing from the gate G toward the seat surface defining surface 91 only is changed, the present invention is not limited to this example. For example, in the present embodiment, the flowing direction of the magnesium alloy M flowing in the direction indicated by arrow A2 and then flowing in the direction toward the seat surface defining surface 91 along the surface of the casting die 90 may be changed by the protruding portion 92 so as not to make contact with the seat surface defining surface 91. Moreover, although the flowing direction of the molten magnesium alloy flowing from the gate G into the cavity C is depicted by three directions indicated by arrows A2 to A4, the flowing direction is not limited to this direction.

The present invention is not limited to a configuration in which the molten magnesium alloy M does not make contact with the seat surface defining surface 91 in the initial flowing stage. However, the flowing direction may be changed so that the amount of the molten magnesium alloy M making direct contact with the seat surface defining surface 91 decreases.

The seat surface defining surface 91 illustrated in FIG. 3(A) is a portion that defines the nut seat surface 313 of the boss core portion 31 in the product after casting. The protruding portion 92 formed on the seat surface defining surface 91 is a portion that defines a recess 313a formed on an outer circumference side of the nut seat surface 313 of the boss core portion 31 in the product after casting.

The protruding portion 92 formed on the seat surface defining surface 91 illustrated in FIG. 3(A) is formed in an annular form so as to surround the circumference of the attachment hole 81 (see FIGS. 1(A) and 1(B)) of the boss core portion 31 in the product after casting. In other words, the recess 313a (see FIG. 1(B)) formed on the outer circumference side of the nut seat surface 313 of the boss core portion 31 is formed in an annular form. In this way, since the protruding portion 92 is formed on the lower side of the boss core portion 31, the flowing direction of the molten magnesium alloy M hitting on a bottom surface C1 of the cavity C for molding the boss core portion 31 and scattering toward the upper side can be changed. That is, the molten magnesium alloy M flowing toward the seat surface defining surface 91a (the inner surface of the die on the lower side in FIG. 3(A)) hits on a protruding portion 92a (the protruding portion on the lower side in FIG. 3(A)) formed on the outer circumference side of the seat surface defining surface 91a whereby the flowing direction changes and the amount of the molten magnesium alloy M making direct contact with the seat surface defining surface 91a can be decreased.

The protruding portion 92 illustrated in FIG. 3(A) preferably protrudes 1.5 mm or more toward the back surface side (the right side in FIG. 3(A)) of the boss core portion in a product after casting. More preferably, the protruding portion 92 protrudes toward the back surface side of the boss core portion within a range between 1.5 mm and 2.0 mm.

As described above, a method for casting the steering-wheel core 100 according to the present embodiment is a method for casting the steering-wheel core 100 including the boss core portion 31 the rim core portion 11, and the spoke core portion 21, wherein the boss core portion 31 having the nut seat surface 313 that makes contact with the nut N when the nut N is fastened to the distal end of the steering shaft S inserted into the boss core portion 31, wherein when the molten magnesium alloy M flows into the casting die 90 for molding the steering-wheel core 100, the molten magnesium alloy M hits on the protruding portion 92 formed on the seat surface defining surface 91 within the inner surface of the casting die 90 whereby the flowing direction of the molten magnesium alloy M flowing toward the seat surface defining surface 91 is changed. The nut seat surface 313 of the boss core portion 31 is a surface that makes contact with the nut N fastened to the steering shaft S when the steering shaft S is coupled to the attachment hole 81 of the boss core portion 31.

When the molten magnesium alloy M flows into the cavity C, the molten magnesium alloy M hits on the protruding portion 92 provided on the seat surface defining surface 91 within the inner surface of the casting die 90 whereby the flowing direction changes. Therefore, it is possible to suppress the molten magnesium alloy M flowing toward the seat surface defining surface 91 from making direct contact with the seat surface defining surface 91. Due to this, the high-temperature and high-pressure molten magnesium alloy M is suppressed from continuously making contact with the seat surface defining surface 91 and the occurrence of a local hot spot is suppressed. As a result, it is possible to decrease the surface roughness (casting surface roughness) of the product after casting. As a result, it is possible to eliminate the need to perform finishing processing after casting and to decrease the manufacturing cost.

As described above, in the method for casting the steering-wheel core 100 according to the present embodiment, the flowing direction of the magnesium alloy M is changed so that the amount of the magnesium alloy M flowing into the casting die 90 at least in the initial flowing stage and making direct contact with the seat surface defining surface 91 decrease.

In this way, when the flowing direction of the magnesium alloy M at least in the initial flowing stage is changed, particularly, the high-temperature and high-pressure molten magnesium alloy M is suppressed from continuously making contact with the seat surface defining surface 91. As a result, it is possible to suppress the occurrence of a local hot spot and to suppress a surface roughness (casting surface roughness) of the product after casting. Therefore, it is possible to eliminate the need to perform finishing processing after casting and to decrease the manufacturing cost.

Next, measurement results of the surface roughness of the nut seat surface of the boss core portion will be described. FIGS. 4(B) through 4(E) are diagrams illustrating the measurement results of a surface roughness of the nut seat surface according to the present invention and a surface roughness of the nut seat surface according to the comparative example, measured using a predetermined surface roughness measuring apparatus.

Figure 4A:
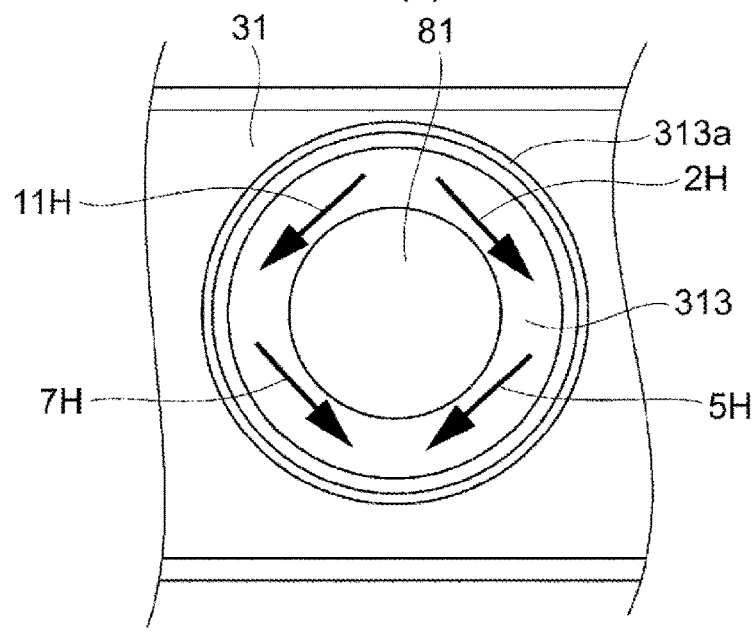
FIG. 4(A) is an elevational view showing measurement areas of metal flow in the boss core portion and FIGS. 4(B) through 4(E) are diagrams for comparing a surface roughness of a nut seat surface of a boss core portion according to the present embodiment and a surface roughness of a nut seat surface of a boss core portion according to a comparative example.
Figure 4B:
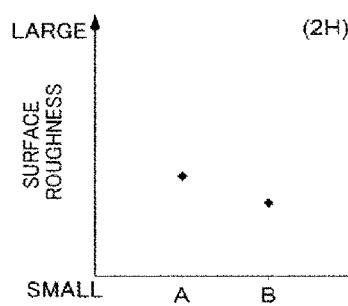
Figure 4C:
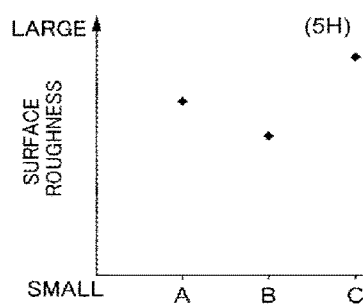
Figure 4D:
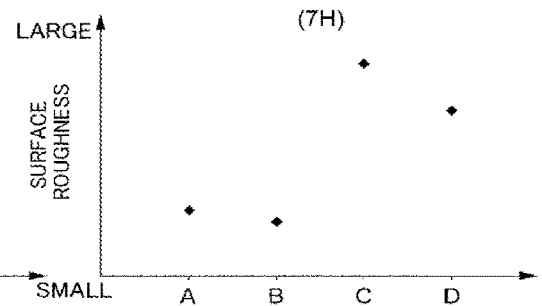
Figure 4E:
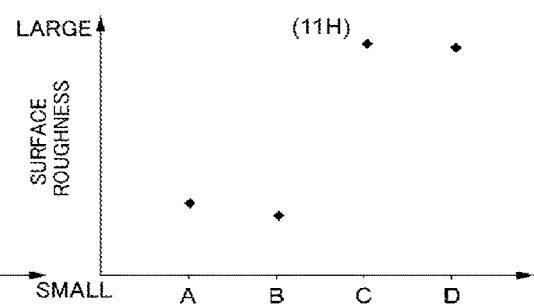

FIG. 4(A) illustrates four measurement portions (2H, 5H, 7H, and 11H), FIG. 4(B) illustrates measurement results of the measurement portion 2H, FIG. 4(C) illustrates measurement results of the measurement portion 5H, FIG. 4(D) illustrates measurement results of the measurement portion 7H, and FIG. 4(E) illustrates measurement results of the measurement portion 11H. The horizontal axis of FIGS. 4(B) to 4(E) indicate measurement targets (A and B correspond to the present invention (see FIG. 2(B)), and C and D correspond to the comparative example (see FIG. 6(B))), and the vertical axis of FIGS. 4(B) to 4(E) indicate the magnitude of surface roughness.

As illustrated in FIGS. 4(B) through 4(E), when the present invention (A and B) and the comparative example (C and D) were compared in terms of the measurement results of the surface roughness for the measurement portions 2H, 5H, 7H, and 11H, it was confirmed that the average value of the surface roughness of the present invention was smaller (i.e. improved) than the average value of the surface roughness of the comparative example. Specifically, the results show that the average value of the surface roughness of the present invention was decreased 39% for the measurement portion 2H, 27% for the measurement portion 5H, 68% for the measurement portion 7H, and 71% for the measurement portion 11H in comparison to the average value of the surface roughness of the comparative example.

As illustrated in the measurement results of FIGS. 4(B) through 4(E), it was confirmed that the surface roughness (casting surface roughness) of the nut seat surface 313 of the boss core portion 31 according to the present invention was improved in relation to the comparative example.

Specifically, it, was confirmed that the average surface roughness (the average value of the measurement portions 2H, 5H, 7H, and 11H) of the nut seat surface of the present invention was approximately 6.0 μm or more in a casting surface stage whereas the average surface roughness of the nut seat surface of the comparative example was approximately 13.0 μm or more in a casting surface state.

In the steering-wheel core 100 of the present embodiment, the recess 313a depressed toward the back surface side of the boss core portion 31 is formed in the nut seat surface 313 of the boss core portion 31 making contact with the nut N fastened to the steering shaft S when the steering shaft S is coupled to the attachment hole 81 of the boss core portion 31, and the recess is formed in an annular form so as to surround the circumference of the nut seat surface 313. Moreover, the average surface roughness of the nut seat surface 313 is 6.0 μm or more in the casting surface state.

However, the nut seat surface 313 makes contact with the nut N coupled to the steering shaft 5, and the nut seat surface 313 needs to have a clean casting surface in order to control the torque of the nut N. In the present embodiment, since the average surface roughness of the nut seat surface 313 in the casting surface state can be deceased as compared to the conventional nut seat surface, it is possible to eliminate the need to perform finishing processing on the nut seat surface 313 after casting. As a result, it is possible to decrease the manufacturing cost.

Hereinabove, embodiments of the present invention have been described by referring to specific examples. However, the present invention is not limited to these specific examples.

That is, these specific examples may be appropriately modified in design by those skilled in the art, and these modifications fall within the scope of the present invention as long as the modifications include the features of the present invention. The respective elements included in the specific examples described above and the arrangement, materials, conditions, shapes, sizes, and the like are not limited to those illustrated but can be modified appropriately.

The invention claimed is:

1. A method for casting a steering-wheel core having a boss core portion coupled to a steering shaft, a rim core portion, and a spoke core portion that couples the boss core portion and the rim core portion to each other, the boss core portion having a nut seat surface that makes contact with a nut when the nut is fastened to a distal end of the steering shaft inserted into the boss core portion, the method comprising;

providing a protruding portion on a surface of an inner surface of a casting die, with the surface forming the nut seat surface; and causing a molten metal to hit on the protruding portion when the molten metal flows into the casting die so that a flowing direction of the molten metal flowing toward the surface that defines the nut seat surface is changed.

2. The method for casting a steering-wheel core according to claim 1, further comprising, the flowing direction of the molten metal is changed so that an amount of the molten metal which flows into the casting die at least in an initial flowing stage and makes direct contact with the surface that defines the nut seat surface decreases.

3. The method for casting a steering-wheel core according to claim 1, further comprising, the protruding portion is formed in an annular form so as to surround a circumference of the surface that defines the nut seat surface.

4. The method for casting a steering-wheel core according to claim 3, wherein the circumference includes an inner circumference and an outer circumference and the annular form surrounds the outer circumference.

5. The method for casting a steering-wheel core according to claim 1, further comprising, the protruding portion protrudes at least 1.5 mm toward a back surface side of the boss core portion.

6. The method for casting a steering-wheel core according to claim 1, further comprising the casting die forms a gate for directing the molten metal to flow into the casting die, the gate oriented to direct the flow in a direction generally parallel with the nut seat surface and the protruding portion obstructing a line between the gate and the nut seat surface.

7. The method for casting a steering-wheel core according to claim 1, further comprising the molten metal provided in the form of a molten magnesium alloy.

* * * * *